United States Patent
Lin

(10) Patent No.: US 9,223,669 B2
(45) Date of Patent: Dec. 29, 2015

(54) SELF-EXPANDING TEST AUTOMATION METHOD

(75) Inventor: Robert Lin, Cupertino, CA (US)

(73) Assignee: Robert Lin, Cupertino, CA (US)

( * ) Notice: Subject to any disclaimer, the term of this patent is extended or adjusted under 35 U.S.C. 154(b) by 400 days.

(21) Appl. No.: 13/345,692

(22) Filed: Jan. 7, 2012

(65) Prior Publication Data

US 2012/0226940 A1 Sep. 6, 2012

(51) Int. Cl.
*G06F 11/36* (2006.01)
*G06F 11/263* (2006.01)

(52) U.S. Cl.
CPC .......... *G06F 11/263* (2013.01); *G06F 11/3688* (2013.01)

(58) Field of Classification Search
CPC .............. G06F 11/362; G06F 11/3668; G06F 11/3688; G06F 11/3672; G06F 11/3664
USPC ...................... 714/25, 32, 33, 45, 46; 717/135
See application file for complete search history.

(56) References Cited

U.S. PATENT DOCUMENTS

| | | | | |
|---|---|---|---|---|
| 4,025,767 A | * | 5/1977 | Bottard | 714/25 |
| 4,617,663 A | * | 10/1986 | Lake et al. | 714/736 |
| 5,513,315 A | * | 4/1996 | Tierney et al. | 714/37 |
| 6,611,936 B2 | * | 8/2003 | Jue et al. | 714/741 |
| 7,047,446 B1 | * | 5/2006 | Maurer et al. | 714/38.1 |
| 7,441,236 B2 | * | 10/2008 | Chon et al. | 717/135 |
| 7,587,637 B2 | * | 9/2009 | Garakani | 714/37 |
| 7,694,181 B2 | * | 4/2010 | Noller et al. | 714/38.11 |
| 8,230,265 B2 | * | 7/2012 | Rajashekara et al. | 714/38.1 |
| 2006/0129892 A1 | * | 6/2006 | Diaconu et al. | 714/38 |
| 2006/0209710 A1 | * | 9/2006 | Watanabe | 370/252 |
| 2010/0077260 A1 | * | 3/2010 | Pillai et al. | 714/46 |

* cited by examiner

*Primary Examiner* — Joseph Schell

(57) ABSTRACT

A method for automatically testing an apparatus controlled by software based on pilot test case file comprising user input sequence data recorded manually and the time stamp of the input. In the process of automated testing, these pre-recorded user inputs are replay with same input sequence but with either the same time interval between two subsequent inputs recorded prior; or with a random time interval autonomously generated in a range set by the test configuration. During the process of replaying user input, a separate plural numbers of background tasks are executed in parallel with random execution delays to generate varying system load and execution timing to simulate the apparatus' unpredictable real operation scenarios. The user input and new random time interval between each user input are recorded at replay as a new expanded test record file for later test result trace and failure analysis.

11 Claims, 4 Drawing Sheets

SELF-EXPANDING TEST AUTOMATION METHOD

FIELD OF THE INVENTION

The present invention relates to a method for automating a computer software testing. Specifically, the invention relates to self-expanding a usage test case based on a sequence of user inputs.

US PATENT REFERENCE

| | | |
|---|---|---|
| 5,513,316 | Apr. 30, 1996 | Rogrigues et al. |
| 5,594,892 | Jan. 14, 1997 | Bonne et al. |
| 5,740,408 | Apr. 14, 1998 | Bonne et al. |
| 6,071,316 | Jun. 6, 2000 | Goossen et al. |
| 6,708,324 B1 | Mar. 16, 2004 | Solloway et al. |
| 6,889,158 B2 | May 3, 2005 | Penov et al. |
| 6,966,013 B2 | Nov. 15, 2005 | Blum et al. |
| 7,286,953 B1 | Oct. 23, 2007 | Li et al. |
| 7,299,382 B2 | Nov. 20, 2007 | Jorapur |
| 7,373,636 B2 | May 13, 2008 | Barry et al. |
| 7,414,635 B1 | Aug. 19, 2008 | Annangi |
| 7,418,306 B2 | Aug. 26, 2008 | Padisetty et al. |
| 7,457,989 B2 | Nov. 25, 2008 | Ulrich et al. |
| 7,464,372 B2 | Dec. 9, 2008 | Achlioptas et al. |
| 7,506,211 B2 | Mar. 17, 2009 | Apostoloiu et al. |
| 7,546,121 B2 | Jun. 9, 2009 | Lipsit |
| 7,568,183 B1 | Jul. 28, 2009 | Hardy et al. |
| 7,617,486 B2 | Nov. 10, 2009 | Sharma et al. |
| 7,624,378 B2 | Nov. 24, 2009 | Achlioptas et al. |
| 7,664,989 B2 | Feb. 16, 2010 | Joshi et al. |
| 7,680,499 B2 | Mar. 16, 2010 | Pi et al. |
| 7,694,181 B2 | Apr. 6, 2010 | Noller et al. |
| 7,702,958 B2 | Apr. 20, 2010 | Kwong et al. |
| 7,707,553 B2 | Apr. 27, 2010 | Roques et al. |
| 7,810,070 B2 | Oct. 5, 2010 | Nasuti et al. |
| 7,823,023 B2 | Oct. 16, 2010 | Kwan et al. |
| 7,840,948 B2 | Nov. 23, 2010 | Chace |
| 7,890,806 B2 | Feb. 15, 2011 | Kwong, et al. |
| 7,895,565 B1 | Feb. 22, 2011 | Hudons et al. |
| 7,913,230 B2 | Mar. 22, 2011 | Vikutan |
| 7,921,345 B2 | Apr. 5, 2011 | Trump et al. |
| 7,926,035 B2 | Apr. 12, 2011 | Musuvathi et al |
| 7,930,683 B2 | Apr. 19, 2011 | Li |
| 7,934,201 B2 | Apr. 26, 2011 | Sweis |
| 7,950,004 B2 | May 24, 2011 | Vieira et al |
| 7,966,523 B2 | Jun. 21, 2011 | Weatherhead |
| 7,979,849 B2 | Jul. 12, 2011 | Feldstein et al |
| 8,001,468 B2 | Aug. 16, 2011 | Khaladkar et al |
| 8,032,790 B2 | Oct. 4, 2011 | Chopra et al |
| 8,056,060 B2 | Nov. 8, 2011 | Bicheno et al |
| 8,087,001 B2 | Dec. 27, 2011 | Hoyek et al |

FOREIGN APPLICATION PRIORITY DATA

| | | |
|---|---|---|
| Jan. 18, 2011 | 201110020689.0 | China Patent Office |

BACKGROUND OF THE INVENTION

Present day software becomes very complex and large scale due to significant processor technology and speed advancement. The testing of an apparatus with such complicated software poses real challenges.

Although manual tests can find many defects in software, it is a very laborious and time consuming process as well as a very expensive endeavor. Because of this, significant efforts have been spent to find more effective test automation methods.

Test automation is the process of creating a computer program to do testing that would otherwise need to be done manually. Once tests have been automated, they can be run quickly and repeatedly with little human interference. Hence it is often the most cost effective method for products test and validation.

How to automate a test is the subject of many studies. One important test automation method is record-and-playback method that let a system interactively record human actions and replay them back any number of times to compare actual execution results to find any software defects. The advantage of this method is that it requires little development efforts for test automation. The weakness of this method is that the automation can only repeat user's activities. The effectiveness of results depend almost entirely on a user's input behavior and the state of apparatus at the time of the test, hence has limited coverage. The method also lacks "active defect seeking" abilities. In order to increase test coverage, a large set of test case records must be manually created that will require significant maintenance work.

Hence it is desirable to invent a more effective automation test method that can retain the simplicity of record-and-playback approach but with the added intelligent for self-expanded test coverage beyond the repeat of user input activities. This is the subject of this invention.

SUMMARY OF THE INVENTION

The present invention disclose a method for automatic testing and validation of computer-controlled apparatus that employ limited manual pilot test cases to self-expand to unlimited and continuous test condition with varying system loading and stress in order to expose system defects that human tests are unable to find with the limited test instances.

The apparatus to be tested is first set to test learn mode to have human to manually run though a usage scenario to allow apparatus with the embodiment of the invention to record each human user input and its time of occurrence into a pilot test case. After the completion of human test run, a complete pilot test case is generated and store into storage media. With such a pilot test case in hand, the apparatus is then set to test run mode for test automation, where the pilot test case is loaded into system and the user inputs recorded prior are replayed one by one in sequence with a time delay between each subsequent user input replay. The time delay is calculated either from the time stamp in the pilot test case as the repeat of user prior manual test run; or is generated randomly. During the replay of the pilot test case, a plural number of background tasks with predefine jobs are executed in parallel with various execution time delays in order to exert unpredictable system loading and stress to the apparatus in test. By repeating this replay of one or multiple pilot test cases automatically and continuously, it is then possible to expose many system defects in the apparatus that any one instance of manual test are not able to create or encounter.

A major advantage of the invention is that it only needs to maintain the limited numbers of pilot test cases for system test and qualification and to let test automation of this invention to self-expand these pilot tests into unlimited test variants in order to expose system defects. Another advantage of the invention is that this method does not consume much resource and is simple to embed into an apparatus in its final production forms.

DETAILED DESCRIPTION OF THE INVENTION

Figure 1:
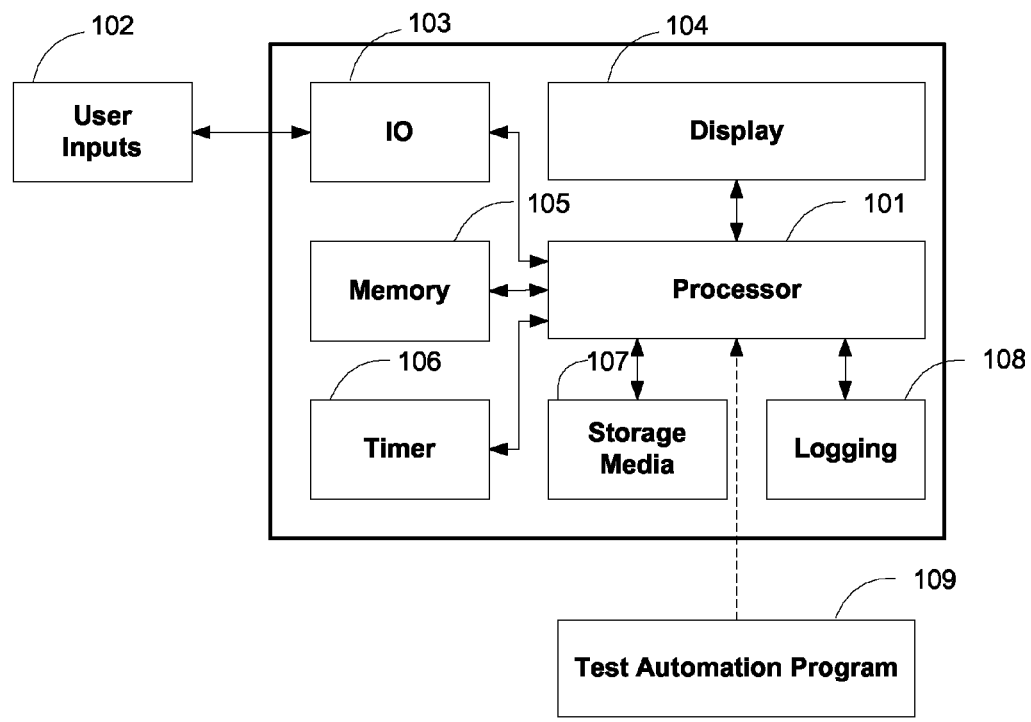
FIG. 1 shows schematically a block diagram of a typical computer controlled apparatus employs the present invention.

FIG. 1 illustrates schematically a typical computer controlled apparatus that the present invention is related to, that comprises of a Central Processor Unit 101, User Input Device 102, Input-Output Interface 103, Display Device 104, Internal Memory 106, Storage Media 107 such as hard-disk or flash storage, and optional Logging Device 108. A user operates the apparatus through input device. The actual user input device can be a keypad, a mouse or a touch screen.

Such an apparatus must go through rigid quality test and validation for various usage scenarios before releasing into market. A smart phone is a typical example of such an apparatus.

The present invention is to automate such an apparatus's test in order to speed up the whole quality test and validation as well as to reduce its associated cost.

The invention defines "test learn mode" and "test run mode" for the test automation.

Figure 2:
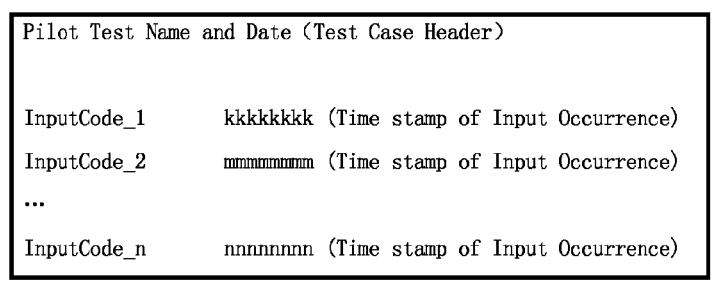
FIG. 2 illustrates a sample implementation of the pilot test case record.

In the test learn mode, a user manually operates the apparatus through input device to fulfill a particular usage scenario to generate a pilot test case. During this pilot test case generation process, apparatus will record each user input and its time stamp in the sequence of its occurrence into a file record in the format shown in FIG. 2. The record consists of necessary header to identify the test case and multi-line user input data that comprises plural bytes for each user input action together with the time stamp when each input occurs.

Figure 3:
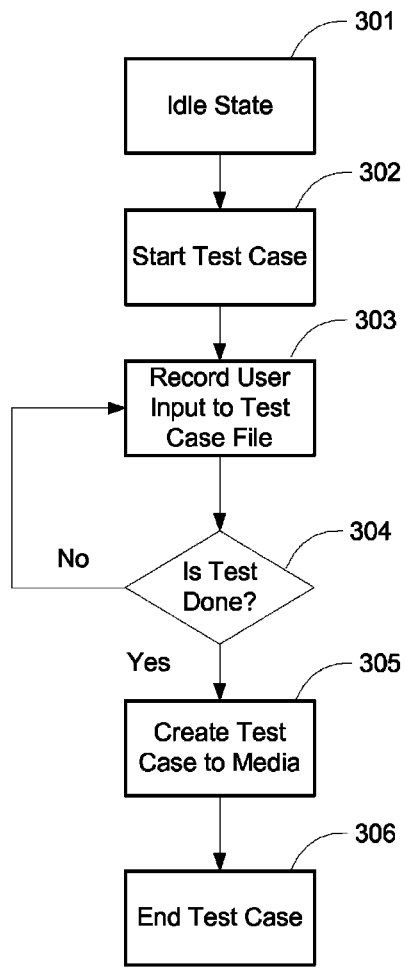
FIG. 3 is a flow chart illustrating a number of steps during the pilot test case generation in the learning mode of the present invention.

FIG. 3 is the block diagram showing software flow chart of this "test learn mode" process to generate pilot test case. At the start of the "test learn mode" process, the apparatus is set to go to a "idle state" 301 that is specifically defined and determined for the apparatus. Every pilot test case will start from this pre-determined "idle state" 301. An example of such idle state in case of smart phone apparatus can be the phone's main menu state.

From this idle state, a user manually enters input in sequences to the apparatus to complete a specific test usage scenario. In case of the apparatus of a smart phone, such a test usage scenario can be a process of user composing a short message and sending it to a designated party. During the pilot test case generation, the apparatus will record each user input data and time of its occurrence in step 303 and will repeat this step until the whole test sequence complete at step 305, where the complete pilot test case record is created on storage media. This same pilot generation process can be applied to different usage scenarios of the apparatus to generate a collection of pilot test cases for later test automation replay.

After recording a pilot test case for the desired usage case based on the flow chart in FIG. 3, the apparatus can then be switch to "test run mode" to replay the pilot case with the added self-expansion coverage as described below.

Figure 4:
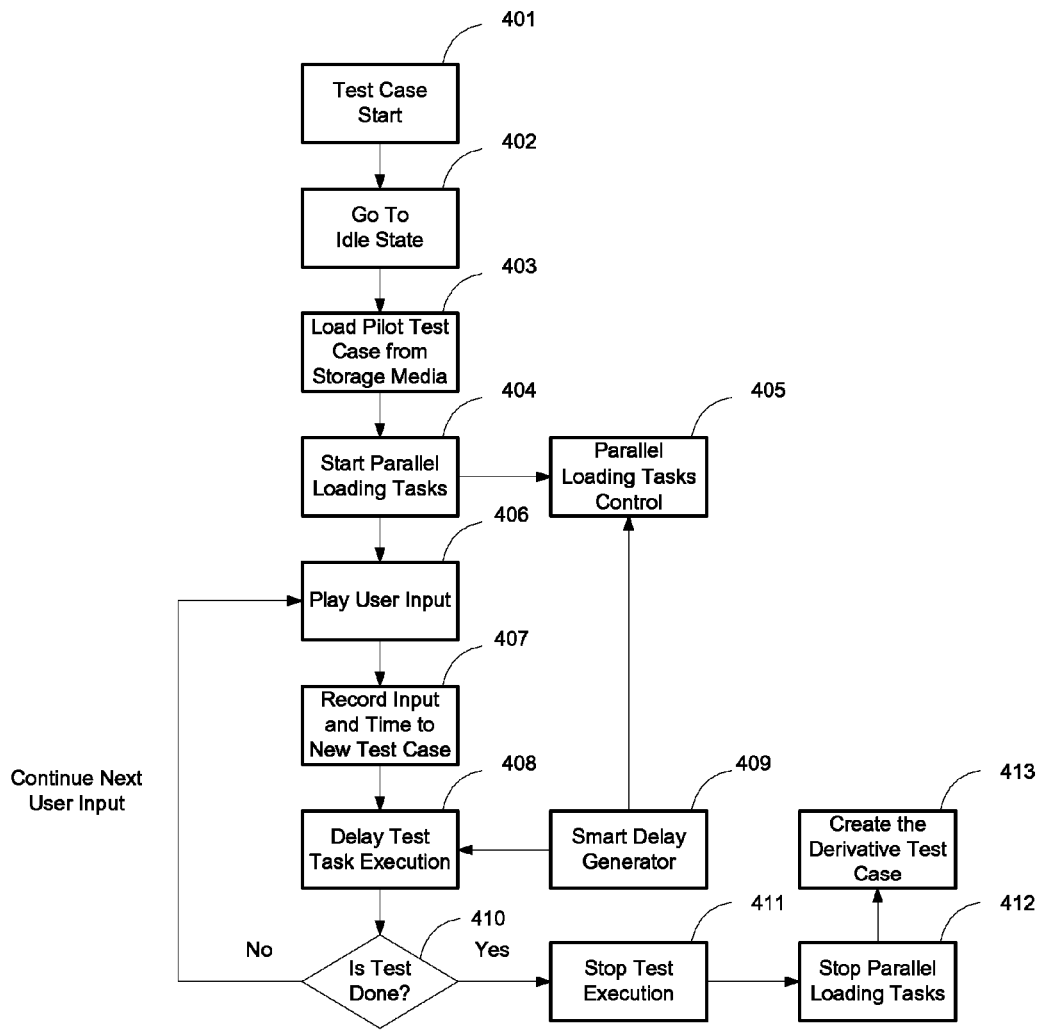
FIG. 4 is a flow chart illustrating a number of steps for test replay with the self-expansion delays and plural numbers of parallel background tasks to create changing and unpredictable system loading and stress during the run mode of the present invention.

In the test run mode, the pilot test case corresponding to the desired apparatus usage scenario is loaded into processor unit from the storage media. As shown in FIG. 4, the apparatus is first set to the same pre-determined "idle state" 401, which is the same state in step 301 in FIG. 3 in order to provide the same known starting state for the apparatus. The pilot test case is then loaded into apparatus from storage media at step 403. Each user input and its time stamp is then retrieved from pilot test case one by one and is replayed in a loop at step 406. The time delay between each user input replay at step 408 is determined based on the two replay run mode configurations described below.

There are two configurations for the replay run mode: repeat mode and random mode. In the repeat mode, the time delay at step 408 is calculated from the time stamps of the two adjacent user inputs from the pilot test case, which is the same time delay when the user manually tests the apparatus at creation of the pilot test case. In this case, the automation test is repeating a human's manual test. In the random mode, the time delay at step 408 will be generated by a random delay generator 409 that is uniformly distributed between [0. T], where the maximum delay T is determined and configured specifically for the apparatus. In this case, the delay between two subsequence user inputs is a random time delay that will be different for each repeat execution of the same pilot test case. The purpose of this is to create unlimited and unpredictable test variants away from the single instance of human manual test in order to expose potential system defects of the apparatus under unpredictable real operation conditions.

During the pilot test case replay, the same user input and the time of replay as well as random time are saved in the new derivative test case at step 407. The derivative test case is used for later defect analysis and validation.

During the test case replay, the test automation can start a plural numbers of background tasks at step 404 in order to exert changing system loading to CPU and various resources of the apparatus under the test. The detail of these background task controls are described by the flow chart in FIG. 5, which the expansion details of step 405.

Figure 5:
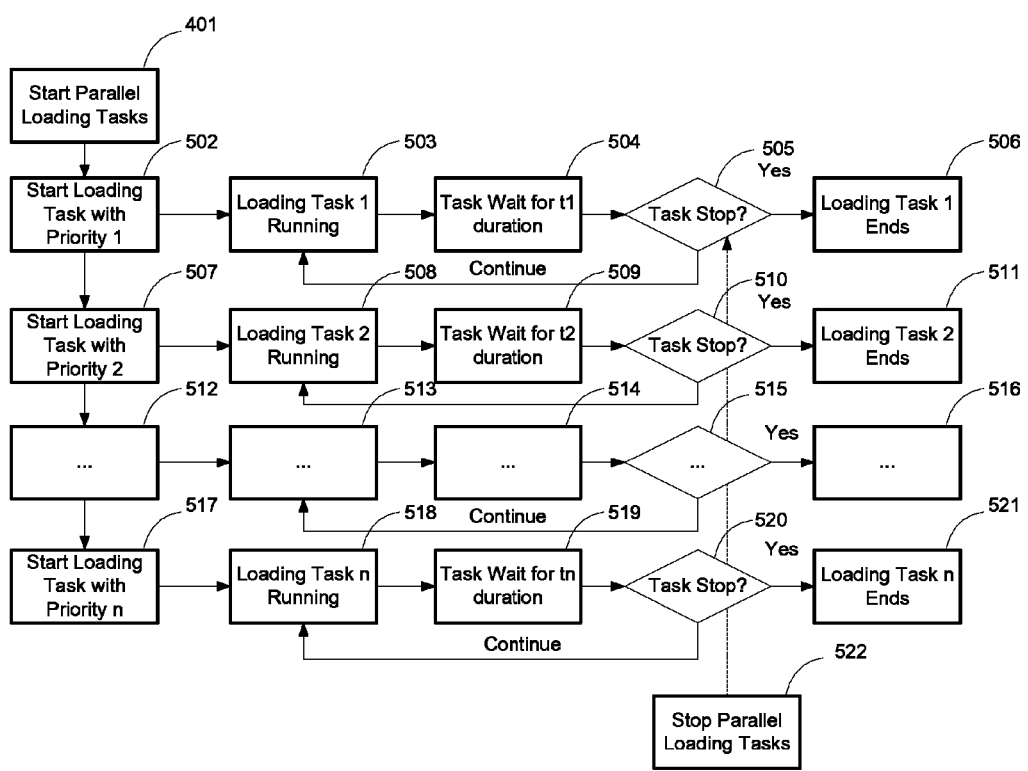
FIG. 5 illustrates the control of parallel background tasks during the test replay of the present invention.

In FIG. 5, the plural numbers of background tasks 1 to n are predefined with different execution priorities and are assigned various job procedures for the apparatus under the test. Each background task is designed to execute its job repeatedly in a loop and with a different random delay during its execution process as shown in steps of 504, 509, 514 and 519. The combination of background task priorities, job procedure and random execution delays will exert changing and unpredictable system loading and stress to the apparatus to simulate and recreate the unpredictable changing condition the apparatus are set to operate in the real life. As an example for these background tasks, in the case of smart phone apparatus, one background task can be assigned to continuously play various music files in the background; another task can be assigned to transfer files in different size from internet to local storage; and still another task can be assigned to repeatedly call a test landline phone number and hang up after short duration of connection; and so on; while the apparatus is replaying the same pilot test case of sending a short message as described prior. These background tasks are commanded to stop at step 412 in both FIG. 4 and FIG. 5 at the completion of pilot test case replay execution.

After each pilot test is replayed, the test automation of this invention can set apparatus back to the same idle state in step 401 to repeat the same pilot test with different random delays and system loading. This repeat execution can continue indefinitely until manual termination or until system halt due to defects. Due to various random delay and various background loading tasks in parallel, even the apparatus replays the same pilot test case, the result operation condition and scenario will vary in the unpredictable way, hence to achieve expanded test result away from the simple repeat of the original human manual test at creation of pilot test case in order to trig and detect potential defects, especially those timing and race condition related system defects in the apparatus. Such an automation process can provide huge time and cost saving benefit for an organization is the QA process.

Each replay execution of pilot test case will produce a new derivative test case in record with new time delay of different values between two subsequent user inputs. Such a derivative test case can later be used both as a reference for defect analysis and as the test case to repeat the test run that trigs a particular defect for the apparatus.

The invention herein has been described in detail in order to provide a skilled in the art with the information needed to apply the novel principles in actual products. The user input referred in the invention is the data or signals from any generic input-output devices for human to interact with the apparatus and is not limited to keypad or key board. However, it is to be understood that the inventions are not to be limited to the specific examples of the embodiments and procedures disclosed and that modifications, both as to the embodiment details and to the procedures, can be accomplished within the scope of the present invention and its claims. Although specific terms are employed herein, they are used in a generic and descriptive sense only and not for purposes of limitation. It is also understood that the invention can be in the form of computer readable medium storing a computer program to execute computer program instructions contain in the program according the method of the instant invention.

What is claimed is:

1. A method for test automation method, comprising the steps of
    a. setting an apparatus into learning mode to generate a test pilot case where said apparatus is first set to a determined idle state; start a test case generation where a user performs a desired task using an input device; record user input and a time stamp of the input occurrence; repeat said recording until said desired task is complete; after said task completion, store complete user inputs and corresponding time stamp of occurrence into a storage media to generate a pilot test case for this desired task,
    b. setting said apparatus into a testing mode to replay said test pilot case where said apparatus is first set to said determined idle state; load and execute a test case file; replay each recorded user input; execute a delay between each user input according to a random delay from a given time range, and
    c. continuing to replay user input and time delay until a complete pilot test record is executed.

2. The method of claim 1, wherein each said pilot test case is generated manually and is stored onto said storage media for later execution.

3. The method of claim 1, wherein the time of said random delay is limited and configured to be between values of [0, T] with maximum T value configurable for the apparatus.

4. The method of claim 1, wherein each user input is stored, in sequence during said learning mode, into said pilot test case.

5. The method of claim 1, wherein said delay between each user input replay is determined by a Random Time Controller to be a newly generate random value.

6. The method of claim 1, wherein said replay of the pilot test case starts from a determined idle state for the apparatus.

7. The method of claim 1, wherein at an end of said pilot test case execution, the apparatus is set to automatically return to said determined idle state to repeat the pilot test case, where this repeated testing is continued until cancellation.

8. The method of claim 1, wherein during the replay of the pilot test case, a new test case record is recorded for each user input replay, and its new time of occurrence is recorded.

9. The method of claim 1, wherein a plurality of parallel background tasks with variant priorities are executed during said continuing to replay user input.

10. The method of claim 9, wherein each of a plurality of background tasks executes said random delay from a Random Time Controller in between its jobs.

11. A non-transitory computer readable medium storing computer instructions that when executed cause a computer to perform a method according to the method of claim 1.

* * * * *